Sept. 3, 1935.                H. W. KACHEL                2,013,517
                           APPARATUS FOR WELDING
                       Filed Dec. 17, 1930         3 Sheets-Sheet 1
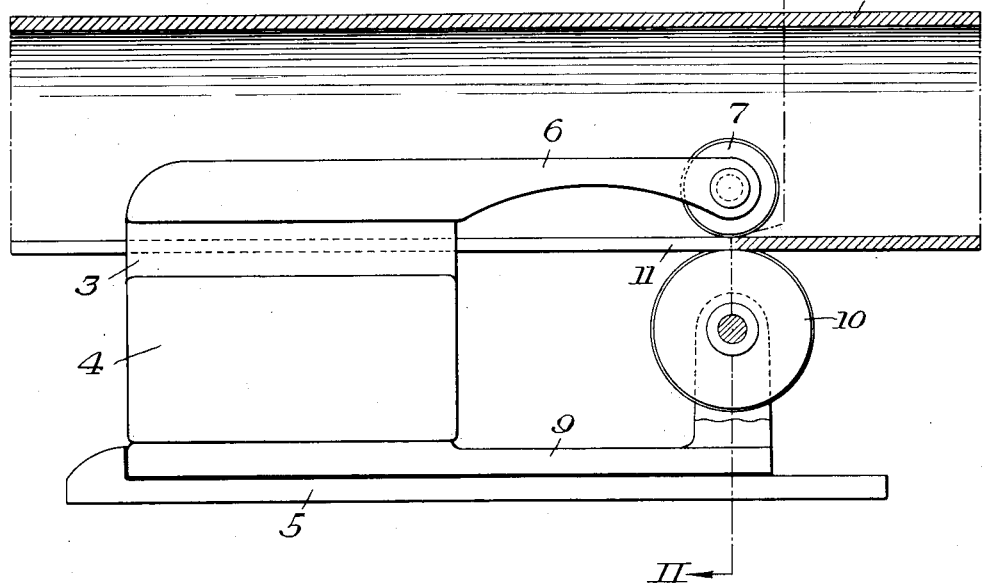
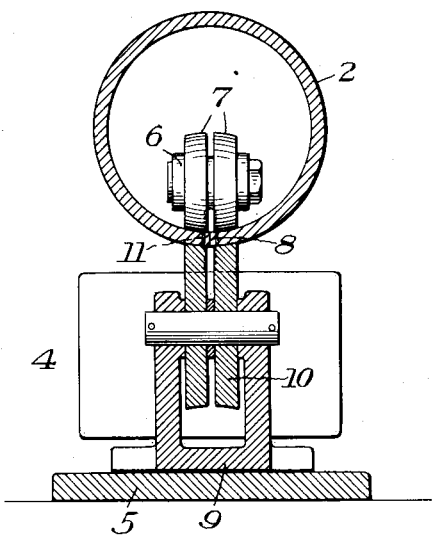
INVENTOR
Henry W. Kachel,
his attys Sept. 3, 1935.  H. W. KACHEL  2,013,517
APPARATUS FOR WELDING
Filed Dec. 17, 1930  3 Sheets-Sheet 2
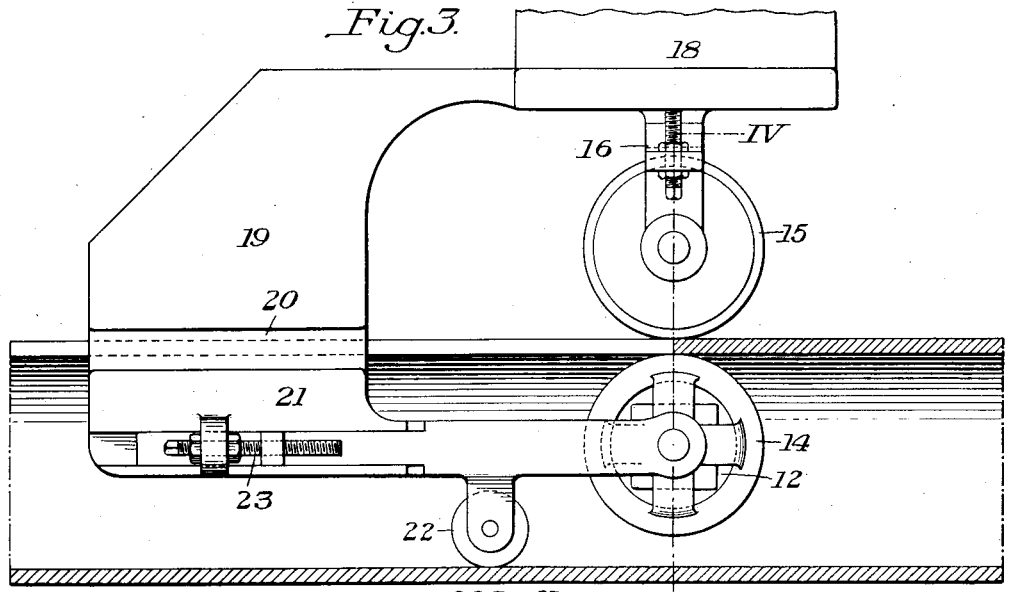
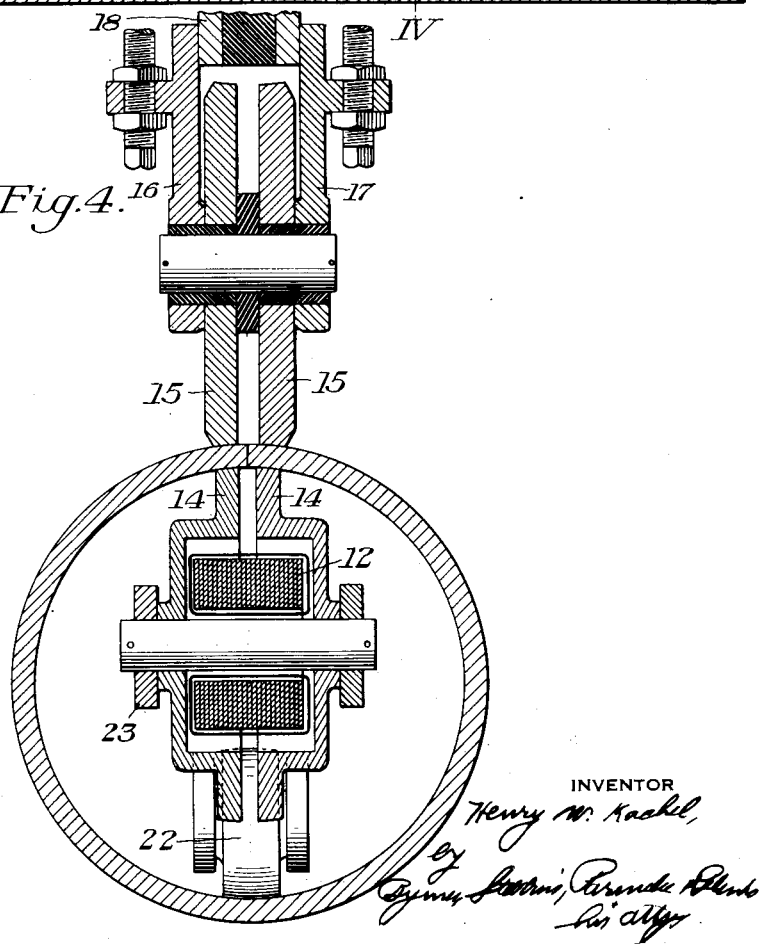
INVENTOR
Henry W. Kachel, Sept. 3, 1935.  H. W. KACHEL  2,013,517
APPARATUS FOR WELDING
Filed Dec. 17, 1930   3 Sheets-Sheet 3
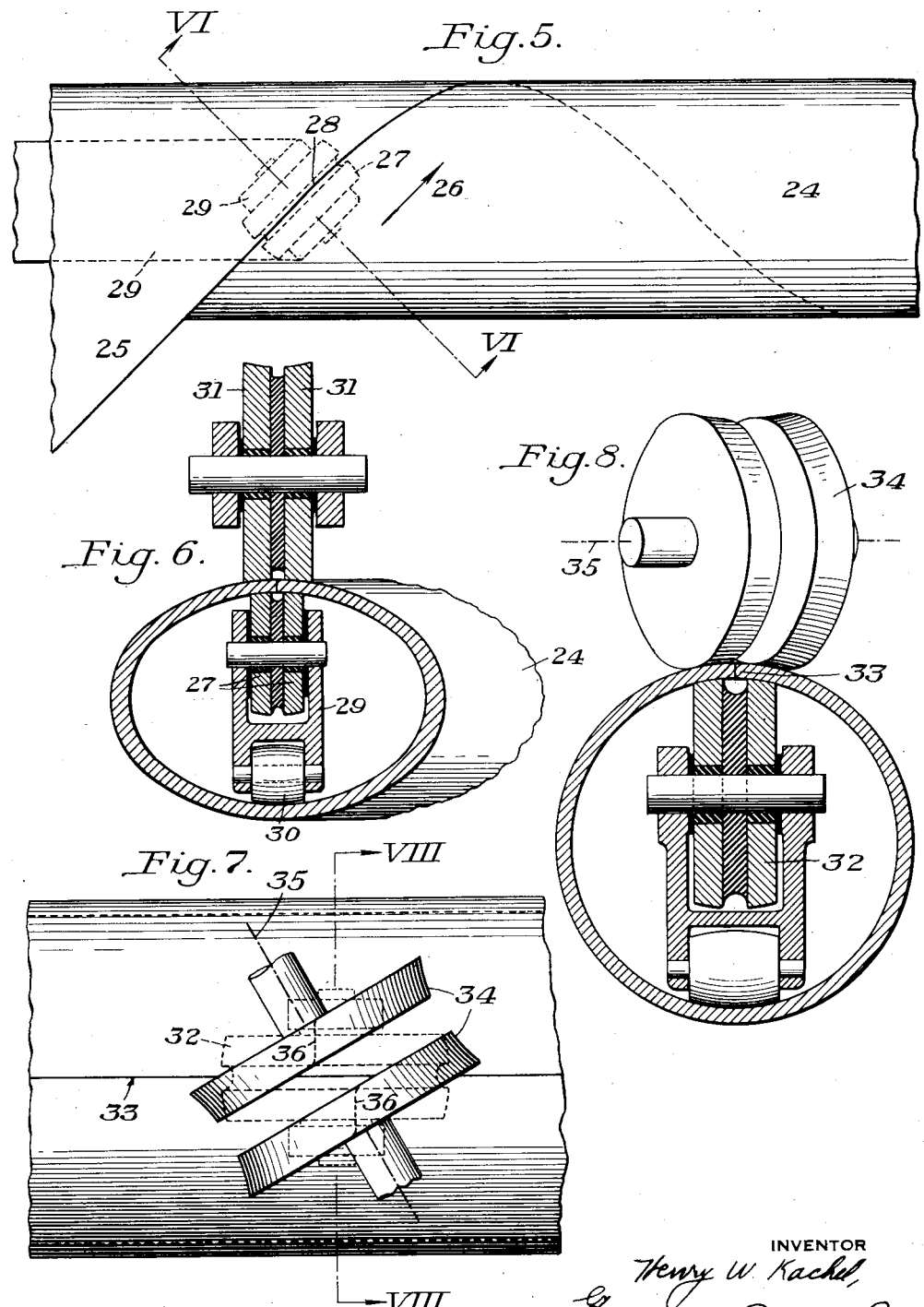

Patented Sept. 3, 1935

2,013,517

UNITED STATES PATENT OFFICE 2,013,517

APPARATUS FOR WELDING

Henry W. Kachel, Youngstown, Ohio, assignor, by mesne assignments, to Direct Current Welding Company, a corporation of Delaware Application December 17, 1930, Serial No. 503,024

12 Claims. (Cl. 219—6)

The present invention relates broadly to the art of welding, and more particularly to a welding method and apparatus more especially adapted for the producing of seams in tubular or substantially tubular articles. For purposes of illustration, the invention will hereinafter be described in connection with the welding of pipes, although it will be understood that the utility thereof is not so limited.

In the welding of substantially tubular articles, of which pipe may be considered as representative, it has heretofore been customary to effect the welding in accordance with one or more standardized systems. Of these systems, resistance welding is perhaps the most representative. In practicing resistance welding it has been the usual practice to provide electrodes on the outside of the pipe, with one electrode, regardless of its particular construction, on either side of the pipe seam, the respective electrodes being in turn connected to or constituting the terminal of a suitable transformer. Such a system has been found satisfactory for low speed welding and for the formation of thin walled tubing. It has, however, been found unsatisfactory at high speeds where thick walled tubing is being produced, because of the practical impossibility of supplying a sufficient current to the material to raise all of the portions thereof adjacent the seam to a welding temperature.

Thus, with comparatively thick material and outside electrodes, it has been found that there is a decided tendency to heat the portion of the material directly in contact with the electrodes to a higher temperature than the inner half of the material which is away from the electrodes. If an attempt is made to supply additional current in order to obtain increased heating, there is likelihood of burning of an appreciable portion of the metal before the remainder thereof is brought up to a welding temperature.

It is one of the objects of the present invention to provide a system of welding which is effective for continuously and uniformly welding comparatively thick gauge material at high speeds. This is accomplished in accordance with the preferred embodiment of the invention by distributing the current supply more effectively between the inner and outer portions of the material whereby effective heating from both sides thereof is obtained. This result may be satisfactorily accomplished in a number of different ways, several of which are shown by way of illustration only in the accompanying drawings.

In the drawings, Figure 1 is a view partly in longitudinal section and partly in elevation of one form of apparatus constructed in accordance with the present invention;

Figure 2 is a transverse sectional view on the line II—II of Figure 1;

Figure 3 is a view similar to Figure 1 illustrating another embodiment of the invention;

Figure 4 is a transverse sectional view on the line IV—IV of Figure 2;

Figure 5 is a diagrammatic top plan view of a modified embodiment of the present invention, parts of the welding apparatus being omitted for sake of clearness;

Figure 6 is a detail sectional view, on an enlarged scale, along the line VI—VI of Figure 5, looking in the direction of the arrows;

Figure 7 is a view similar to Figure 5, illustrating another embodiment of the invention; and Figure 8 is a transverse sectional view on the line VIII—VIII of Figure 7.

In the embodiment of the invention illustrated more particularly in Figures 1 and 2 of the drawings, the pipe 2 to be welded is illustrated as having been shaped to substantially tubular form with the adjacent edges of the tubular blank in such spaced relationship as to permit the blank to be bodily passed over a combined guide and conductor 3. The guide and conductor 3 constitutes one lead of a transformer 4 carried by a suitable base 5. The lead 3 is provided with an extension 6 adapted to extend into the body of the blank and forwardly in the direction of travel an appreciable distance. At its inner end it is provided with a pair of roller contacts or electrodes 7, one of which lies on each side of the proposed line of weld 8.

The opposite side of the transformer secondary is likewise connected to a conductor 9 projecting forwardly in substantial parallelism to the extension 6 but so spaced therefrom as to lie outside of the blank. Adjacent its end it carries a pair of roller contacts or electrodes 10 positioned similarly to the electrodes 7, but on the outside of the material.

With the construction just described, and with the transformer energized, current will flow through the edge portions 11 of the blank in a direction substantially radially thereof from the inner to the outer electrodes or vice versa, thereby uniformly heating the edge portions throughout their entire thickness. The edge portions having been brought to a welding temperature by the current flow therethrough, may subsequently be brought tightly into engagement under conditions of welding pressure in any desired manner as well understood in the art.

The form of the invention illustrated in Figures 1 and 2 is particularly adapted to the production of a bottom seam, having reference to the position of the blank during the heating operation. In Figures 3 and 4 there is illustrated an embodiment of the invention particularly adapted for the formation of a top seam. In accordance with this embodiment there may be provided a rotary transformer 12 of any desired construction having peripheral contact portions 14 adapted to engage the inner surface of the blank on opposite sides of the seam, whereby heating current will flow through the material in a direction substantially circumferentially of the portion between the contacts, and from one contact to the other. Rotary transformers of the general type herein contemplated are well known in the art, as evidenced, for example, by the patent to Fulda No. 1,199,537 of September 26, 1916.

Cooperating with the rotary transformer just described, but positioned exteriorly of the blank, is a pair of adjustable contacts or electrodes 15 which may also be of the rotary transformer type, but which are herein illustrated as connected respectively to the leads 16 and 17 of a transformer 18. The desired relationship between the inner and outer electrodes may be continuously maintained by providing a frame 19 on one portion of which the transformer 18 is supported. The frame is of such construction as to provide an elongated relatively thin central portion 20 adapted to pass between the slightly spaced edges of the blank to permit the maintenance of an electrode support 21 within the blank. The support 21 may be held so as to maintain the contact portions 14 of the rotary transformer 12 in engagement with the inner surface of the blank, by the provision of a suitable positioning roll 22.

The rotary transformer 12 is herein illustrated as secured to the support 21 through the medium of an adjustable connection 23 by means of which the position of the rotary transformer may be advanced or retracted relatively to the contact zone of the electrodes 15. This construction is often times extremely desirable as, for example, in cases where it is of advantage to have the heating current impulses distributed lengthwise of the material. With the contacts 14 offset with respect to the contacts 15 in a direction longitudinally of the blank, as permitted by the adjustment 23, the flow of current between the contacts 15 at any given instant will be longitudinally offset with respect to the current flow between the contacts 14, thereby precluding localized heating and the production of a so-called "stitch" effect.

Similar effects may be accomplished electrically by so regulating the transformers that the phase of the current at any given instant with respect to the different electrodes may be different. Thus, the phase adjustment may be such that at a time of maximum current flow between the contacts 15 there is a condition of minimum current flow between the contacts 14, with the contacts positioned in the same transverse plane as illustrated in Figure 4, while with a maximum current flow between the contacts 14 there will be a zero current flow between the contacts 15. In this manner, the heating impulses of the respective electrodes are successively or progressively effective on the material to insure substantially continuous heating thereof as distinguished from intermittent heating such as characteristic of the so-called stitch welding process.

In Figures 5 and 6 of the drawings, I have illustrated the invention as applied to the production of spirally welded pipe. In Figure 5 there is illustrated a portion of a completed pipe 24 and a section of strip 25 being fed forwardly into welding position, the pipe rotating and advancing in the general direction of the arrow 26. So positioned as to engage the under side of the material is a pair of roller contacts or electrodes 27 so spaced as to lie on opposite sides of the seam line 28. These electrodes, similarly to the electrodes 14, may constitute a part of an inner rotary transformer, or may be electrically connected to a stationary transformer (not shown) in any desired manner.

In Figure 6 of the drawings the electrodes 27 are illustrated as journaled in a suitable frame 29 carrying a locating roller 30. The location of the electrodes 27 is such that they extend in a direction substantially parallel to the proposed line of weld, thereby requiring a special peripheral contour, as illustrated in Figure 6, for effective engagement with the inner surface of the material. This contour will preferably be such that the electrodes contact the material throughout substantially the entire width of the face portions thereof whereby the desired electrical conditions for the maximum flow of heating current into and out of the material from one of the electrodes to the other is insured.

In Figure 5 the outer electrodes 31 are not shown, these electrodes, however, being illustrated in Figure 6 in proper position for cooperation with the inner electrodes 27. Similarly to the electrodes 27, the electrodes 31 may constitute directly connected parts of a rotary transformer or may be electrically connected to a suitable stationary transformer at the will of the operator.

It will be understood that in many cases a combined rotary transformer and electrode unit is desirable for the reason that such a construction makes it possible to have the transformer leads connecting the transformer and the electrodes as short as possible. Particularly in case of an inner electrode where it would be necessary to have the leads pass from a transformer located physically outside of the blank to a point physically within the blank, is the rotary type structure of advantage. With respect to the outside electrodes, it is usually possible to so locate the transformer that the leads to the electrodes will not be of undue length.

In Figures 7 and 8 of the drawings there is illustrated another embodiment of the invention in which the inner electrodes 32 which, as before described, may constitute part of a combined rotary transformer and electrode unit, or separate contact rollers, are disposed on opposite sides of the seam line 33 and in substantial parallelism thereto. Cooperating with the inner electrodes 32, are outer electrodes 34 which are herein illustrated as disposed in inclined relationship to the seam 33, but as rotatable about a common axis 35. The advantage of such an inclination of the electrodes is to provide a line of contact 36 for each of the electrodes which is of greater length than the width of the faces, thereby facilitating the passage of current from the electrodes into the material and vice versa. The greater contact length per unit of electrode width makes this construction particularly useful in the welding of large diameter pipe having thick walls.

By having the axes 35 of the electrodes 34 inclined to the seam line, the lines of contact 36 are longitudinally offset one from the other as clearly apparent from Figure 7 of the drawings. The amount of this offsetting may be further changed to increase or decrease the same by a suitable movement of one of the electrodes in such a direction as to bring the respective axes of the electrodes into offset relationship. In this manner the extent or area of the zone lying effectively between the electrodes may be increased or diminished and a variation in the heating effect correspondingly obtained.

All of the forms of the invention are characterized by the provision of inner and outer electrodes whereby a better distribution of heating current is made possible. With pairs of inner and outer electrodes connected to individual transformers, or constituting, with the material being welded, a complete electrical circuit, each pair of electrodes is only responsible for the heating of substantially half of the thickness of the metal, whereby the complete body of metal may be brought up to the desired temperature without the necessity of localized burning. This constitutes a broad distinction over ordinary types of welding apparatus in which the current flow has had to be such as to extend completely through the material, a distribution in accordance with the present invention dividing the area of metal between a plurality of electrodes and thereby correspondingly cutting down the area through which the current from any given pair of electrodes has to heat.

The advantages of the invention will be apparent from the foregoing description taken in connection with the drawings forming a part of this application.

While I have herein illustrated and described certain preferred embodiments of the invention, and only such parts as directly contribute to the current input features of a complete welding system, it will be apparent that the invention is adapted for use with a wide number of different types of welding apparatus, and that changes in the construction and operation of the parts herein disclosed may be made without departing either from the spirit of the invention or the scope of my broader claims.

I claim:

1. Welding apparatus, comprising substantially coaxial material engaging electrodes, means for maintaining said electrodes at an angle to the longitudinal axis of the material, and means for supplying current to said electrodes to cause current to flow therebetween through the material being welded.

2. In a welding apparatus, a pair of substantially coaxial electrodes adapted to cooperate with material to be welded on opposite sides of the proposed line of weld, means for maintaining said electrodes at an angle to said line and means for supplying current to said electrodes to cause current to flow therebetween through the material being welded.

3. In a welding apparatus, substantially coaxial electrodes of the disk type, means supporting said electrodes to provide a zone of contact with the material to be welded of greater length than the width of the disks, and means for supplying current to said electrodes to cause current to flow therebetween through the material being welded.

4. In a welding apparatus for welding substantially tubular blanks, a pair of electrodes on opposite sides of the seam and contacting the outer surface of the blanks, and a second pair of electrodes on opposite sides of the seam and contacting the inner surface of the blank, one pair of said electrodes being skewed relatively to the other pair.

5. In a welding apparatus for welding butt joints between adjacent edges of material, a pair of electrodes on opposite sides of the joint and contacting one surface of the material, and a second pair of electrodes on opposite sides of the joint and contacting the other surface of the material, one pair of said electrodes being skewed relatively to the other pair.

6. Apparatus for welding together the edges of a plate formed into a tube blank having a longitudinal seam cleft, including a pair of electrode rolls adapted to engage the blank exteriorly, said rolls being rotatable and having their axes lying in a common plane inclined to the axis of the blank.

7. Apparatus for welding together the edges of a plate formed into a tube blank having a longitudinal seam cleft, including a pair of arcuate-faced electrode rolls adapted to engage the blank exteriorly, said rolls being rotatable and coaxial and having their axes lying in a plane inclined to the axis of the blank, the contour of the roll faces adapted to engage the blank having a greater radius of curvature than that of the blank.

8. Means for supplying electric current to the edges of an axial seam cleft in a moving, formed tube blank, for heating them to welding temperature, comprising a pair of coaxial rotatable conducting discs disposed in planes at oblique angles to the path of movement of the blank, and having tangential engagement with said edges respectively, the axes of the discs lying in a common plane inclined to the axis of the blank.

9. Electrodes for the electric welding of an axial seam between the edges of formed pipe blanks, comprising conducting discs mounted for exterior engagement with the blank and for rotation about axes at oblique angles to the axis of the blank, said discs being shaped to conform closely to the tube contour, and provide an extended area of contact therewith.

10. In a welding apparatus for welding substantially tubular blanks, a pair of electrodes on opposite sides of the seam and contacting the outer surface of the blanks, a second pair of electrodes on opposite sides of the seam and contacting the inner surface of the blank, one pair of said electrodes being skewed relatively to the other pair, and means for offsetting one pair of electrodes with respect to the other pair of electrodes lengthwise of the line of weld.

11. In a welding apparatus for welding substantially tubular blanks, a pair of electrodes on opposite sides of the seam and contacting the outer surface of the blanks, a second pair of electrodes on opposite sides of the seam and contacting the inner surface of the blank, one pair of said electrodes being skewed relatively to the other pair, and means for supplying overlapping heating impulses across the seam to be welded from the inside and outside of the blank.

12. In a welding apparatus for welding substantially tubular blanks, a pair of electrodes on opposite sides of the seam and contacting the outer surface of the blanks, a second pair of electrodes on opposite sides of the seam and contacting the inner surface of the blank, one pair of electrodes being skewed relatively to the other pair, and means for maintaining an out-of-phase relationship of the current supplied from opposite sides of the blank.

HENRY W. KACHEL.